US010134279B1

(12) United States Patent
Toyoda et al.

(10) Patent No.: US 10,134,279 B1
(45) Date of Patent: Nov. 20, 2018

(54) SYSTEMS AND METHODS FOR VISUALIZING POTENTIAL RISKS

(71) Applicants: Toyota Motor Engineering & Manufacturing North America, Inc., Erlanger, KY (US); Toyota Jidosha Kabushiki Kaisha, Toyota-shi, Aichi-ken (JP)

(72) Inventors: Heishiro Toyoda, Ann Arbor, MI (US); Hiroto Hamada, Aichi (JP)

(73) Assignees: Toyota Motor Engineering & Manufacturing North America, Inc., Plano, TX (US); Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 15/625,595

(22) Filed: Jun. 16, 2017

Related U.S. Application Data

(60) Provisional application No. 62/501,855, filed on May 5, 2017.

(51) Int. Cl.
G08G 1/16 (2006.01)
G08G 1/01 (2006.01)
G02B 27/01 (2006.01)
G06K 9/00 (2006.01)
G06T 19/00 (2011.01)
G06K 9/62 (2006.01)
G06T 13/80 (2011.01)
B60K 35/00 (2006.01)
G06N 99/00 (2010.01)

(52) U.S. Cl.
CPC ............... *G08G 1/16* (2013.01); *B60K 35/00* (2013.01); *G02B 27/0101* (2013.01); *G06K 9/00805* (2013.01); *G06K 9/6277* (2013.01); *G06N 99/005* (2013.01); *G06T 13/80* (2013.01); *G06T 19/006* (2013.01); *G08G 1/0112* (2013.01); *B60K 2350/1096* (2013.01); *B60K 2350/2052* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 6,744,370 B1 | 6/2004 | Sleichter, III et al. |
| 6,974,414 B2 | 12/2005 | Victor |
| 7,246,050 B2 | 7/2007 | Sheridan |
| 7,620,497 B2 | 11/2009 | Maass |
| 7,982,620 B2 | 7/2011 | Prokhorov et al. |
| 8,390,440 B2 | 3/2013 | Krautter et al. |
| 9,047,703 B2 | 6/2015 | Beckwith et al. |

(Continued)

Primary Examiner — Brent Swarthout
(74) Attorney, Agent, or Firm — Christopher G. Darrow; Darrow Mustafa PC

(57) ABSTRACT

System, methods, and other embodiments described herein relate to inducing awareness in a driver about a surrounding environment of a vehicle using an augmented reality (AR) system within the vehicle. In one embodiment, a method includes identifying one or more potential hazards to the vehicle in the surrounding environment from sensor data collected from at least one sensor of the vehicle. The method includes rendering, within the AR system, a display scenario about the one or more potential hazards by displaying one or more graphical elements that correlate with locations of the one or more potential hazards in the surrounding environment.

20 Claims, 6 Drawing Sheets

(56) References Cited

U.S. PATENT DOCUMENTS

| | | |
|---|---|---|
| 9,075,563 B2 | 7/2015 | Kim |
| 9,251,715 B2 | 2/2016 | Hing et al. |
| 9,296,396 B2 | 3/2016 | Gluck et al. |
| 9,428,183 B2 | 8/2016 | Foley |
| 2008/0204208 A1* | 8/2008 | Kawamata ................ B60R 1/00 340/435 |
| 2009/0319095 A1 | 12/2009 | Cech et al. |
| 2010/0253594 A1 | 10/2010 | Szczerba |
| 2014/0266655 A1* | 9/2014 | Palan ................ G06K 9/00805 340/435 |
| 2014/0266656 A1* | 9/2014 | Ng-Thow-Hing ..... G08G 1/166 340/435 |
| 2014/0354684 A1* | 12/2014 | Beckwith ................ G06F 3/011 345/633 |
| 2015/0316765 A1 | 11/2015 | Kim et al. |
| 2015/0360698 A1 | 12/2015 | Beyene et al. |

* cited by examiner

SYSTEMS AND METHODS FOR VISUALIZING POTENTIAL RISKS

CROSS REFERENCE TO RELATED APPLICATIONS

This application claims benefit of U.S. Provisional Application No. 62/501,855, filed on May 5, 2017, which is herein incorporated by reference in its entirety.

TECHNICAL FIELD

The subject matter described herein relates in general to systems for engaging a driver on driving tasks and, more particularly, to using an augmented reality (AR) display to render graphics about potential hazards to the vehicle.

BACKGROUND

Many different factors can influence whether a driver engages with and is aware of driving tasks and environmental aspects relating to the operation of a vehicle. For example, a driver can choose to focus on various personal electronic devices (e.g., smartphone), infotainment integrated with the vehicle, interacting with passengers, viewing surrounding drivers/scenic views, and so on. Moreover, even when the driver attempts to actively engage with the driving tasks, vigilance decrement can cause the driver to experience a loss of vigilance as time progresses. Furthermore, a driver may still not exhibit proper driving technique for a particular circumstance even when drivers are engaged and aware of surroundings. That is, a driver may not exhibit appropriate care when driving through an area of high risk (e.g., blind corner) because, for example, the driver may not understand risks associated with the particular circumstances. Thus, ensuring vigilance of the driver and awareness for different hazards presents various difficulties.

As a further matter, approaches that provide audible alerts to maintain vigilance and/or to inform the driver of risks can be interpreted as an annoyance by the driver instead of an effective guarantor of engaging the driver. Additionally, further approaches that require a driver to keep their hands on the steering wheel and/or to maintain their eyes forward-facing can also be ineffective since the driver may engage in the noted postures to simply satisfy the monitoring system while still daydreaming or focusing on other tasks. Consequently, the noted approaches fail to maintain vigilance of the driver on driving tasks.

SUMMARY

In one embodiment, example systems and methods relate to a manner of informing a driver of potential hazards to a vehicle by using an augmented reality (AR) system to graphically depict the potential hazards. For example, an engagement system as discussed herein may actively collect data about a surrounding environment of a vehicle in order to scan for potential hazards to the vehicle. That is, the engagement system collects sensor data from one or more sensors of the vehicle and analyzes the sensor data to identify whether any objects, group of objects, and/or features/circumstances in the surrounding environment represent potential hazards to the vehicle. In general, the potential hazards can include many different aspects of the surrounding environment but may include such examples as blind corners, roadway conditions (e.g., potholes, sharp curves, etc.), configurations of objects near the roadway that impair vision of the driver, and so on. Once the engagement system identifies the potential hazards, the engagement system controls the AR system to render graphics that depict information about the potential hazards as an overlay to an actual view of the surrounding environment. In one embodiment, the engagement system animates the graphics as though the potential hazards were actually occurring in order to provide the driver with an animated visual representing the potential hazards. In this way, the engagement system can, for example, induce the driver to engage with the surrounding environment while also informing the driver of the potential hazards.

In one embodiment, an engagement system for inducing awareness in a driver about a surrounding environment of a vehicle using an augmented reality (AR) system within the vehicle is disclosed. The engagement system includes one or more processors with a memory communicably coupled to the one or more processors. The memory stores a monitoring module including instructions that when executed by the one or more processors cause the one or more processors to identify one or more potential hazards to the vehicle in the surrounding environment from sensor data collected from at least one sensor of the vehicle. The memory stores an engagement module including instructions that when executed by the one or more processors cause the one or more processors to render, within the AR system, a display scenario about the one or more potential hazards by displaying one or more graphical elements that correlate with locations of the one or more potential hazards in the surrounding environment.

A non-transitory computer-readable medium for inducing awareness in a driver about a surrounding environment of a vehicle using an augmented reality (AR) system within the vehicle. The non-transitory computer-readable medium storing instructions that when executed by one or more processors cause the one or more processors to identify one or more potential hazards to the vehicle in the surrounding environment from sensor data collected from at least one sensor of the vehicle. The instructions include instructions to render, within the AR system, a display scenario about the one or more potential hazards by displaying one or more graphical elements that correlate with locations of the one or more potential hazards in the surrounding environment.

A method for inducing awareness in a driver about a surrounding environment of a vehicle using an augmented reality (AR) system within the vehicle. The method includes identifying one or more potential hazards to the vehicle in the surrounding environment from sensor data collected from at least one sensor of the vehicle. The method includes rendering, within the AR system, a display scenario about the one or more potential hazards by displaying one or more graphical elements that correlate with locations of the one or more potential hazards in the surrounding environment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
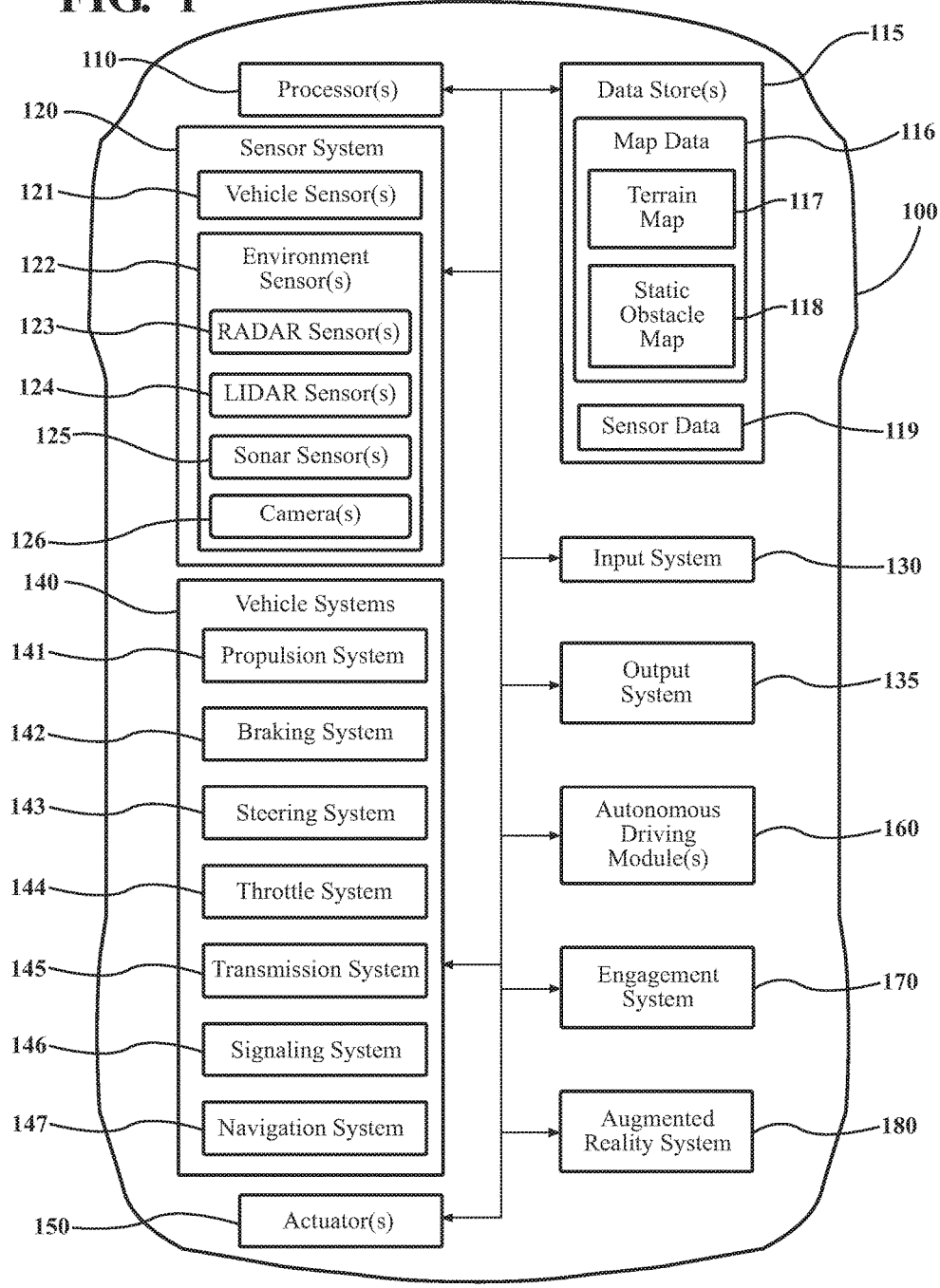
FIG. 1 illustrates one embodiment of a vehicle within which systems and methods disclosed herein may be implemented.

Systems, methods and other embodiments associated with improving driver engagement are disclosed. As mentioned previously, a driver may become disengaged from the vehicle and driving tasks for many different reasons. However, whether the source of disengagement is actively induced through distracted behaviors such as using personal electronic devices or occurs passively through vigilance decrement, driver disengagement presents difficulties in relation to safety and appropriate operation of a vehicle. Moreover, an ability of the driver to identify potential hazards can vary according to a level of skill/experience of the driver. Consequently, depending on the experience/skill of the driver, the driver can remain engaged but fail to identify the potential hazards in some circumstances from the lack of experience.

Thus, embodiments of an engagement system and associated methods are disclosed herein to promote driver engagement and identification of potential hazards. In one embodiment, functionality implemented by a disclosed engagement system is provided according to analogous concepts associated with the Marginal Value Theorem (MVT). The marginal value theorem generally relates to motivations of an animal to move between foraging locations when seeking food. For example, a particular animal remains in a present location so long as food is present, risks are relatively low, an effort to obtain food is relatively low, and so on. When the various factors balance out the animal may remain in a present foraging location due to the motivations to stay in-place or a lack of motivations to leave and seek an additional food source. However, an imbalance in the noted factors can motivate the animal to seek further foraging locations.

Thus, in a similar way, the presently disclosed engagement system and associated methods provide for the driver self-engaging on driving tasks. That is, for example, the disclosed engagement system provides for functionality that causes the driver to engage with the vehicle and driving tasks at the volition of the driver and not, for example, through audible alerts or other sensory indicators that seek to force or directly persuade the driver to engage with the vehicle and the driving tasks.

In further embodiments, the engagement system can employ additional and or separate functionality to induce the driver to engage the vehicle and the driving tasks. For example, in one embodiment, the engagement system includes functionality to generate an urge within the driver to engage in boring driving tasks (e.g., monitoring the road, grabbing the steering wheel in a straightaway, generally maintaining vigilance) in an unconscious manner. That is, instead of providing active alerts or other feedback that are generated to inform the driver that the driver needs to be aware, the engagement system induces feelings or urges within the driver to make the driver want to engage the vehicle and the driving tasks.

Consequently, as described herein in various embodiments, the engagement system can employ interactive AR display elements (e.g., graphical elements including animations) to engage the driver with the vehicle and the surrounding environment of the vehicle. Accordingly, the disclosed systems and methods improve driver engagement on driving tasks and awareness of surroundings through motivating the self-engagement of the driver. Furthermore, the engagement system can mitigate vigilance decrement, which is, in the context of operating a vehicle, generally a tendency of the driver to become disengaged from a surrounding environment over time when not physically engaged and, thus, less aware of aspects surrounding the vehicle and aspects that possibly affect the operation of the vehicle when the vehicle is operating autonomously.

Thus, the engagement system is, for example, implemented within the vehicle along with further systems such as driver monitoring systems (e.g., cameras for eye-tracking), an augmented reality (AR) system, and so on. Therefore, in one embodiment, the engagement system simultaneously monitors a driver of the vehicle, and surroundings of the vehicle, while controlling an augmented reality display to render different visuals that induce the driver to self-engage with the driving tasks.

For example, in one embodiment, the engagement system can monitor the surrounding environment to identify potential hazards. The potential hazards are, for example, aspects of the surrounding environment that represent a likelihood of risk to the vehicle and thus are circumstances of which the driver should generally be aware. Thus, the engagement system can collect sensor data from sensors of the vehicle to identify the potential hazards. Once the engagement system identifies one or more potential hazards, the engagement system renders graphics within the AR system that correlate with the potential hazards. One example of a potential hazard is when the vehicle is traveling along a roadway with a series of automobiles parked along a side of the roadway. This circumstance represents a potential hazard because the parked automobiles can obstruct a view of the driver in relation to pedestrians or other objects that may quickly emerge from between them. Consequently, the engagement system, in one embodiment, animates graphical elements depicting persons or other objects moving from between the automobiles into the roadway. In this way, the engagement system can induce the driver to be aware of the potential hazards while engaging the driver through the AR system.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an engagement system 170 that is implemented to perform methods and other functions as disclosed herein relating to improving driver engagement through detecting potential hazards and rendering display scenarios (i.e., graphical elements and combinations of graphical elements) for the potential hazards within an augmented reality (AR) system 180. As illustrated, the augmented reality (AR) system 180 is an additional aspect of the vehicle 100. However, it should be noted that while the AR system 180 is illustrated as a sub-component of the vehicle 100, in various embodiments, the AR system 180 can be partially integrated with the vehicle or separate from the vehicle 100. Thus, in one or more embodiments, the AR system 180 can communicate via a wired or wireless connection with the vehicle 100 to correlate functionality as discussed herein. Moreover, the AR system 180 can include one or more displays (e.g., integrated or mobile) within which to display graphic elements to the driver and/or passengers.

It should be appreciated that the AR system 180 can take many different forms but in general functions to augment or otherwise supplement viewing of objects within a real-world environment surrounding the vehicle 100. That is, for example, the AR system 180 can overlay graphics and animations of graphics using one or more AR displays in order to provide for an appearance that the graphics are integrated with the real-world. Thus, the AR system 180 can include displays integrated with a windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In this way, the AR system 180 can augment or otherwise modify a view of a driver/passenger in order to provide an enriched/embellished visual sensory experience.

The noted functions and methods will become more apparent with a further discussion of the figures.

Figure 2:
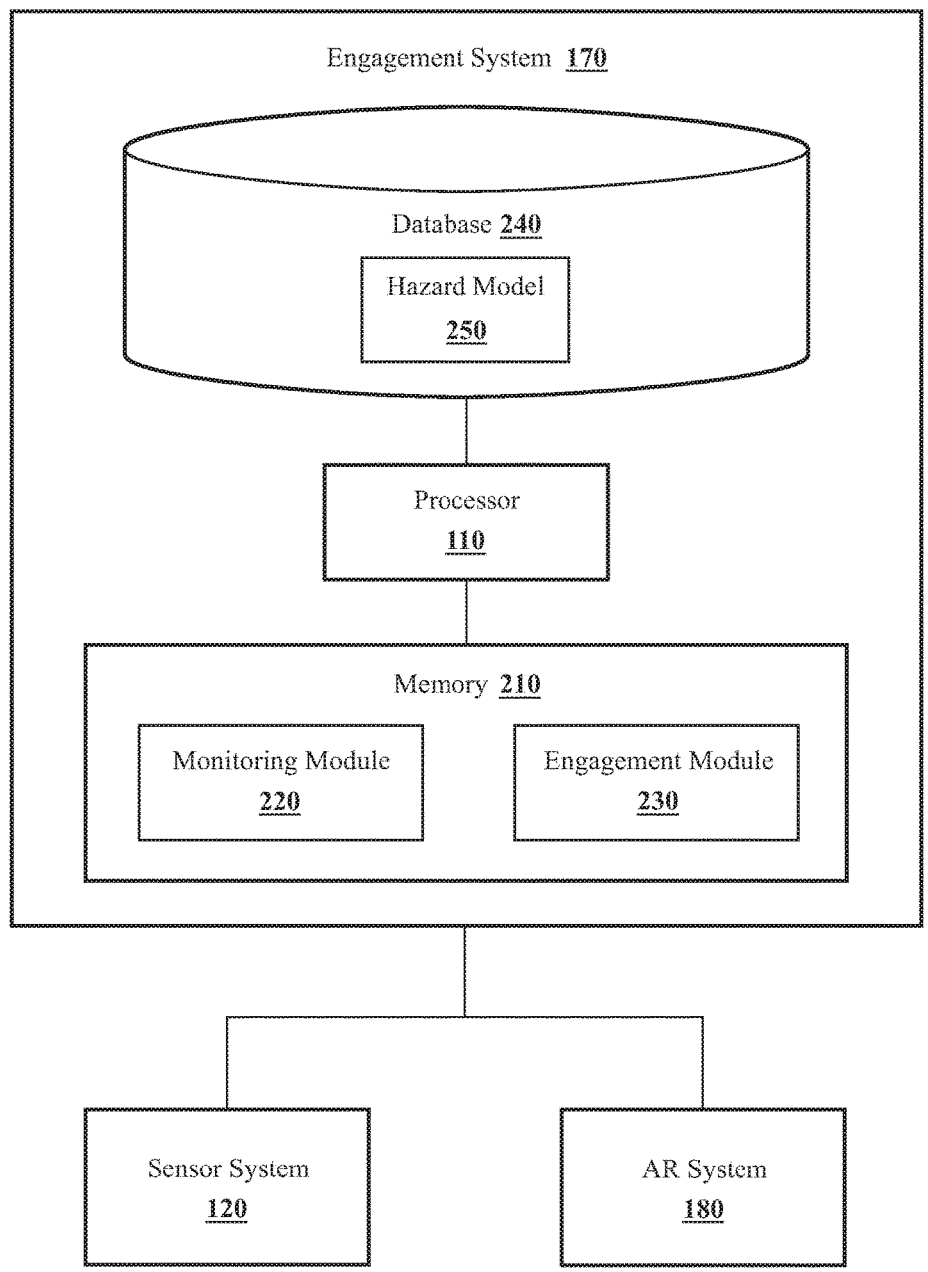
FIG. 2 illustrates one embodiment of an engagement system that is associated with detecting potential hazards and rendering graphical elements within an augmented reality system about the potential hazards.

With reference to FIG. 2, one embodiment of the engagement system 170 of FIG. 1 is further illustrated. The engagement system 170 is shown as including a processor 110 from the vehicle 100 of FIG. 1. Accordingly, the processor 110 may be a part of the engagement system 170, the engagement system 170 may include a separate processor from the processor 110 of the vehicle 100, or the engagement system 170 may access the processor 110 through a data bus or another communication path. In one embodiment, the engagement system 170 includes a memory 210 that stores a monitoring module 220 and an engagement module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the monitoring module 220 generally includes instructions that function to control the processor 110 to collect sensor data from one or more sensors of the vehicle 100. The sensor data is, in one embodiment, collected electronic data about observations of one or more objects in an environment proximate to and surrounding the vehicle 100 and/or other aspects about the surroundings. Moreover, in further aspects, the sensor data can include information about the driver, information about contextual aspects of the present environment (e.g., time of day, the day of the year, school zones, proximity to parks, etc.), and so on. Thus, the monitoring module 220 controls the sensor system 120 to collect data about both the surroundings, a present context, and about a state of the driver.

In one embodiment, driver state information is information that characterizes present actions of the driver, where a gaze of the driver may be directed, autonomic responses of the driver, biological responses/conditions of the driver, and so on. It should be appreciated that the present disclosure provides an exemplary listing of aspects associated with the driver that can be monitored to produce the driver state information; however, this listing is not to be construed as limiting and is provided as an exemplary list of possibilities for purposes of this discussion.

Accordingly, by way of example, the driver state information can include information about a direction of a gaze, a path/track of the gaze, heart rate, blood pressure, respiratory function, blood oxygen levels, perspiration levels, pupil dilation/size, brain activity (e.g., EEG data), salivation information, hand/arm positions, foot/leg positions, a general orientation of the driver in the vehicle 100 (e.g., forward-facing, rear-facing, etc.), seat position, rate of movement, facial feature movements (e.g., mouth, blinking eyes, moving head, etc.), and so on.

Additionally, the monitoring module 220 can determine the driver state information in multiple different ways depending on a particular implementation. In one embodiment, the monitoring module 220 communicates with various sensors of the sensor system 120 including one or more of: camera(s) 126 (e.g., for gaze/eye tracking), heart rate monitor sensors, infrared sensors, seat position sensors, and so on. In one embodiment, the sensors are located within a passenger compartment of the vehicle 100 and can be positioned in various locations in order to acquire information about the noted aspects of the driver and/or aspects related to the driver.

Moreover, in one embodiment, the engagement system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 stores the sensor data along with, for example, metadata that characterizes various aspects of the sensor data. For example, the metadata can include location coordinates (e.g., longitude and latitude), relative map coordinates or tile identifiers, time/date stamps from when the separate sensor data was generated, and so on.

Moreover, the database 240 may include one or more computational and/or statistical models such as hazard model 250. In one embodiment, the hazard model 250 characterizes the sensor data about the surrounding environment in order to identify potential hazards. That is, the monitoring module 220 uses the hazard model 250 to identify potential hazards according to the sensor data collected by the monitoring module 220. Accordingly, in one embodiment, the hazard model 250 informs the monitoring module 220 about a likelihood of risk for the particular aspects of the surrounding environment so that the monitoring module 220 can identify the potential risks and the engagement module 230 can inform the driver of the potential hazards through the AR system 180.

Thus, in one embodiment, the engagement module 230 generally includes instructions that function to control the processor 110 to render a display scenario that depicts the potential hazards in the surrounding environment through, for example, the AR system 180. That is, the engagement module 230 processes information about the potential hazards to determine whether the potential hazards constitute a display scenario. In one embodiment, the engagement module 230 determines whether a likelihood of risk associated with one or more of the potential hazards satisfies a hazard threshold. Thereafter, the engagement module 230 determines graphical elements and/or other aspects associated with rendering the potential hazard and controls the AR system 180 to display the graphical elements for the display scenario. Accordingly, the engagement module 230 can control the AR system 180 to display static graphical elements over locations of the potential hazards, to animate the graphical elements to portray the potential hazards as though the potential hazards were actually occurring even though they are not (e.g., animate an outline of a person stepping into roadway from between parked cars), and so on.

Additionally, in further aspects, the monitoring module 220 monitors the driver for a response to the display scenario (e.g., tracks eyes of the driver). Subsequently, depending on a particular response of the driver, the engagement module 230 adjusts how the display scenario is being rendered in order to, for example, engage the driver and ensure the driver is aware of the potential hazard. In either case, the engagement system 170 through the noted modules 220 and 230, continuously monitors for hazards and renders different graphical elements in displays of the AR system 180 to engage the driver on driving tasks, educate the driver on the potential hazards and how to control the vehicle in relation to the potential hazards, and generally to inform the driver about the surrounding environment.

Moreover, in one embodiment, the engagement system 170 is configured in a manner so as to induce behaviors (e.g., reflexive behaviors) in the driver so that the driver can be trained on various driving tasks/scenarios such as the noted potential risks. In one example, the engagement system 170 identifies the potential hazards using the display scenarios that are projected graphical elements on a windshield or within glasses worn by the driver via the AR system 180. The graphical elements can identify the potential hazards, inform the driver about why the potential hazards are a concern, and can also indicate how the driver should react (e.g., slow down, maintain certain distance, avoid passing, etc.). In addition to providing the graphical indication, in one embodiment, the engagement system 170 can also provide haptic, auditory, and other stimuli associated with rendering the display scenario for the potential hazard. In further aspects, the engagement system 170 can emulate the operation of the vehicle 100 to provide guidance on how to react to the potential hazard according to, for example, defined hazards in the database 240 and thus provide reflexive behavior training to the driver.

Figure 3:
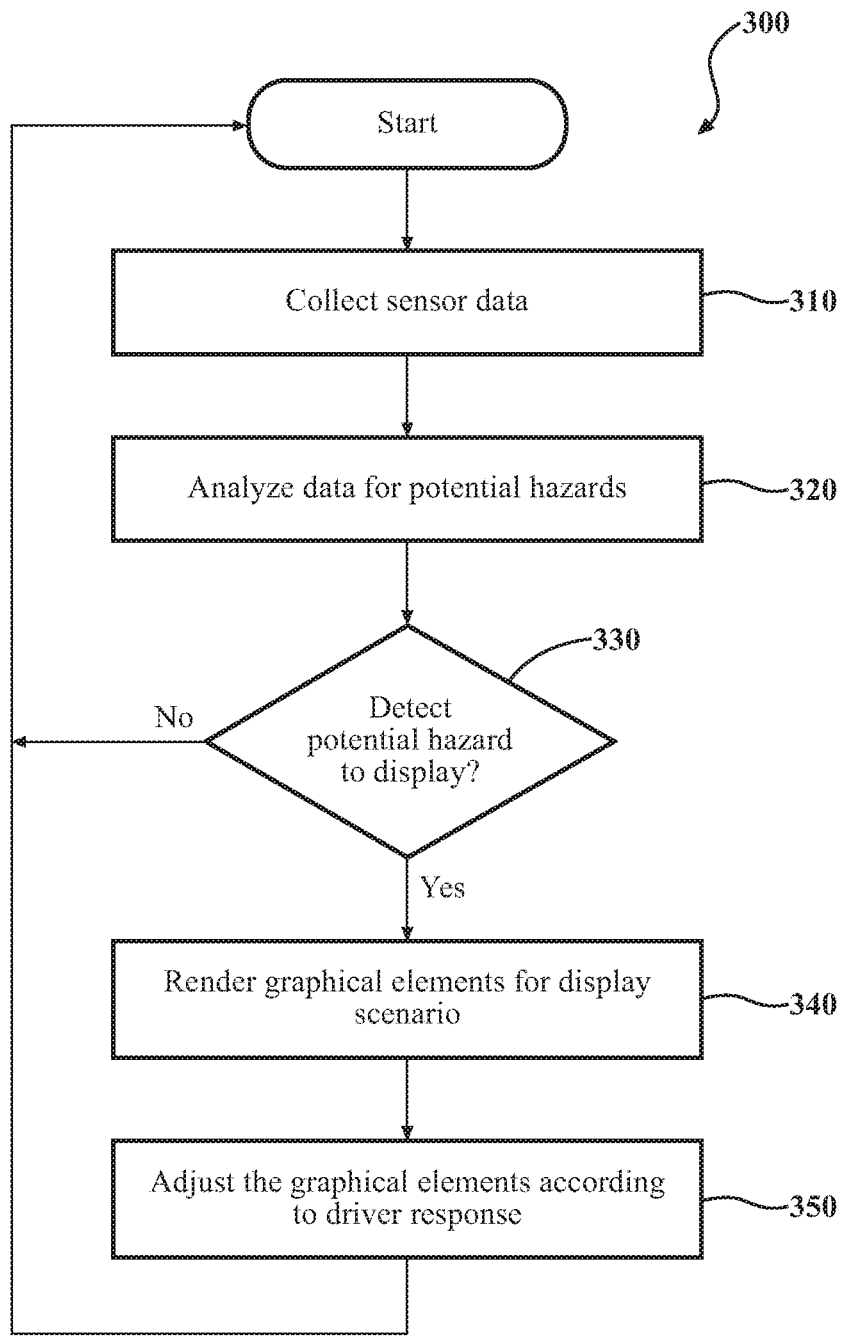
FIG. 3 illustrates one embodiment of a method that is associated with inducing driver engagement by using an AR system within a vehicle to render graphical elements about potential hazards in a surrounding environment.

FIG. 3 illustrates a flowchart of a method 300 that is associated with inducing driver engagement on potential hazards by using an augmented reality (AR) display within a vehicle to render graphical elements. Method 300 will be discussed from the perspective of the engagement system 170 of FIGS. 1 and 2. While method 300 is discussed in combination with the engagement system 170, it should be appreciated that the method 300 is not limited to being implemented within the engagement system 170, but is instead one example of a system that may implement the method 300.

At 310, the monitoring module 220 collects data from at least one sensor of the vehicle 100. In one embodiment, the monitoring module 220 collects data from sensors of the sensor system 120 including lidar 124, radar 123, and/or other sensors on at least a semi-continuous basis. That is, for example, the monitoring module 220 collects the sensor data every x seconds (e.g., 0.1 s) to maintain an up-to-date view of the surrounding environment and the driver. In general, the monitoring module 220 is operable to collect data from whichever sensors are available within the vehicle 100 and/or collect data from third party sources (e.g., weather sources, traffic sources, etc.) through, for example, a communications system of the vehicle 100. In either case, the monitoring module 220 generally collects data associated with several different classes of information.

For example, the monitoring module 220 can collect environmental information, contextual information, and driver state information. The environmental information is information about the surroundings of the vehicle 100 including information about objects (e.g., locations and trajectories), obstacles, terrain, surfaces, and so on. The contextual information is generally ancillary data or metadata about a current location and/or general context including information such as a time of day, a day of the week, geopolitical boundaries, municipal boundaries and special districts (e.g., school zones), local laws (e.g., speed limits, HOV lane restrictions), historical driving information (e.g., locations of frequent traffic incidents/crashes), operating characteristics of the vehicle 100 (e.g., brake wear, oil levels, etc.), weather, internal path planning data from the autonomous module 160, trajectory data from the autonomous module 160, other internal decision making information of the autonomous driving module 160, and so on.

The driver state information generally characterizes a current awareness and physical state of the driver and includes, for example, a current gaze/line-of-sight of the driver, eye tracks/movements, rates of eye movements, pupil dilation, control input patterns, and/or other information that is indicative of engagement/awareness of the driver in relation to driving tasks and the surrounding environment. In further embodiments, the driver state information also includes personal monitoring information from a health tracking/monitoring devices such as a personal pedometer, fitness monitor, or the like. For example, the personal monitoring information can include sleep habits, heart rates, food consumption, current weight trends, exercise habits, and so on.

In general, the monitoring module 220 collects information at 310 that informs the engagement system 170 about the surrounding environment and the driver in order to facilitate identifying potential hazards and displaying aspects about the potential hazards through the AR system 180. Thus, while the above examples of different forms of data are provided, the noted data is provided as an exemplary listing and should not be construed as a complete/limiting list of data elements.

At 320, the monitoring module 220 analyzes the data collected at 310. In one embodiment, the monitoring module 220 analyzes the collected data to identify potential hazards within the surrounding environment. The potential hazards are, for example, objects, or other aspects for which the engagement module 230 is to render a display scenario including one or more visuals within the AR system 180. Thus, display scenarios can include potential hazards (e.g., pedestrians, moving objects, locations of potential jaywalking or unseen pedestrians, etc.) and other scenarios that can be useful to the driver when operating the vehicle 100.

More particularly, the potential hazards are likelihoods of risk from detected objects and circumstances (e.g., associations between detected objects and/or contextual circumstances) in the surrounding environment. That is, the potential hazards represent risks (e.g., collisions) to the vehicle 100 in the surrounding environment. In general, the potential hazards can be classified as discrete hazards and contextual hazards. The discrete hazards are plain openly visible risks to the vehicle 100 that include, for example, detected objects with intersecting current or projected/forecasted future trajectories that are predicted to intercept or closely miss the vehicle 100, and other similar direct risks. By contrast, the contextual hazards are latent hazards arising from general circumstances of increased risk involving, for example, associations between objects, contextual states or properties of the environment and detected objects, hidden or obscured objects or points of entry onto the roadway, areas of obstructed views, areas of historically higher traffic incidents/collisions, and so on. By way of example, the contextual hazards can include blind corners, areas of limited or obstructed views such as vehicles parked along a roadway, blind spot hazards, zones proximate to schools/emergency vehicle entrances/falling rocks/etc., circumstances of reduced vehicle performance under weather/mechanical conditions, and other hazards that are not discrete.

Thus, in one embodiment, the monitoring module 220 identifies the potential hazards by analyzing the sensor data according to, for example, the hazard model 250. That is, in one embodiment, the monitoring module 220 characterizes aspects of the surrounding environment as provided in the sensor data to determine whether the combination of objects, and other factors constitute one or more potential hazards to the vehicle 100. Additionally, the monitoring module 220 may accept the sensor data as electronic inputs and process the electronic inputs according to a machine learning algorithm and learned aspects embodied in the hazard model 250 to identify the potential hazards. Therefore, it should be appreciated that the monitoring module 220 in combination with the hazard model 250 can form a computational model such as a machine learning logic, a deep learning logic, a neural network model, or another similar approach. In either case, the monitoring module 220, when implemented as a neural network model or another computational model, in one embodiment, electronically accepts the sensor data, as previously indicated. Accordingly, the monitoring module 220, in concert with the one or more models, produce various determinations/assessments (e.g., discrete hazards, contextual hazards, etc.) as an electronic output that characterizes the noted aspect as, for example, a single electronic value. Moreover, in further aspects, the system 170 can collect the noted data, log responses, and use the data and responses to subsequently further train the models.

Furthermore, in one embodiment, the hazard model 250 can be a defined hazard model that includes modeled data from, for example, particular scenarios representing potential hazards to the vehicle 100. Thus, the defined hazard model(s) can be, for example, installed with the engagement system 170 in order to provide the system 170 with the ability to identify the particular potential hazards. Moreover, while the hazard model 250 is discussed as including the defined hazard model(s), the hazard model 250 can also include modeled data about potential hazards as accumulated through machine learning, as previously discussed.

In either case, at 320, the monitoring module 220 analyzes the sensor data according to the hazard model 250 to identify the likelihoods of risk associated with hazardous encounters involving the vehicle 100 within the surrounding environment. As a result, the likelihoods of risk for various aspects of the surrounding environment identify potential hazards and why the various aspects are potential hazards.

Consequently, at 330, the engagement module 230 determines which potential hazards identified at 320 will be rendered in the AR system 180 as display scenarios. In one embodiment, the engagement module 230 filters or otherwise assesses which of the potential hazards are to be rendered according to, for example, a hazard threshold and/or additional information such as driver skill level. Thus, in one embodiment, the engagement module 230 can select which potential hazards to display according to preference, risk, threat level, and so on. For example, the hazard threshold defines a likelihood of risk that is to be satisfied by the potential hazards to qualify for display. That is, when a potential hazard satisfies the hazard threshold (e.g., 30% likelihood of risk or greater), then the engagement module 230 renders graphical elements for the potential hazard. Otherwise, the engagement module 230, for example, ignores the potential hazard as being insignificant or generally not a concern.

Moreover, the engagement module 230 can adjust the hazard threshold according to, in one embodiment, a skill level of the driver, a selected mode (e.g., training), current awareness/engagement of the driver on driving tasks, historic encounters by the driver with similar potential hazards (e.g., failure to properly navigate a hazard), and so on. In this way, the engagement module 230 can customize how many and/or which potential hazards are ultimately displayed to the driver in order to induce the driver to engage with driving tasks while informing the driver of the potential hazards.

At 340, the engagement module 230 renders graphical elements that correlate with the potential hazards within one or more AR displays of the AR system 180. In one embodiment, the engagement module 230 renders graphical elements within the AR system 180 by rendering overlays on objects/regions within the surrounding environment (e.g., animations, avatars, etc.), and so on. In one embodiment, the engagement module 230 provides graphics that explain hazards (e.g., why something is a hazard), explain control behaviors for avoiding the potential hazards (e.g., suggested speed, suggested distance, suggested steering maneuver, suggested indicator light usage, etc.) and so on. In still further embodiments, the system 170 can emulate hazards and actions of the vehicle 100 by, for example, rendering simulated obstacles/hazards and/or by controlling the vehicle 100 to perform various maneuvers for which the driver should provide counter controls while rendering graphical elements as hazards, and so on. Moreover, the engagement system 170 can provide additional information that is accessible to the driver subsequently about particular aspects of why the potential hazards represent risks to the vehicle 100 (e.g., selectable display explaining/identifying risk factors that form the potential hazards).

In further aspects, the engagement module 230 renders graphical elements as animations of the potential hazards as though the potential hazards are occurring when, in fact, the potential hazards are not occurring. Thus, the portrayal or imitation of the potential hazard by the engagement module 230 through the AR system 180 acts as a warning to the driver about the potential hazard. Moreover, when the engagement module 230 renders the graphical elements in familiar forms such as with shapes of persons including children, families, bouncing balls, animals (e.g., dogs, cats, etc.), etc., the graphical elements induce a heightened sense of responsibility within the driver by relating the potential hazard to the driver. That is, when the driver is aware of a particular nature of the potential hazard such as a child running into the roadway, the driver generally becomes more aware and cautious of the potential hazard since the graphical elements facilitate relating the potential hazard to the driver. Thus, the driver may be self-motivated to engage the driving tasks to avoid the potential hazards.

By way of example, the engagement module 230 can control the AR system 180 to render animations of objects intersecting with a current/planned/future trajectory of the vehicle 100 from unexpected locations in the surrounding environment, animations of objects moving from behind blind corners, animations of objects within zones proximate to the vehicle 100, animations that highlight the zones within the surrounding environment associated with the potential hazards, animations of persons walking/running into a path of the vehicle 100, and so on. The above listing is not intended to be limiting, but is provided to illustrate examples of possible animations produced by the engagement module 230.

At 350, the engagement module 230 selectively adjusts the display scenario as rendered at 340. For example, in one embodiment, the monitoring module 220 continues to collect sensor data as the graphical elements are rendered within the AR system 180. Thus, the monitoring module 220 captures data from one or more sensors that characterizes a present engagement/awareness of the driver with the vehicle 100 and the present operating environment of the vehicle 100. In general, the monitoring module 220 can collect information about a direction of a gaze, a path/track of the gaze, heart rate, blood pressure, respiratory function, blood oxygen levels, perspiration levels, pupil dilation/size, brain activity (e.g., EEG data), salivation information, hand/arm positions, foot/leg positions, a general orientation of the operator in the vehicle 100 (e.g., forward-facing, rear-facing, etc.), seat position, rate of movement, facial feature movements (e.g., mouth, blinking eyes, moving head, etc.), control inputs from the driver, and so on.

Additionally, the monitoring module 220 can collect the driver state information in multiple different ways depending on a particular implementation. In one embodiment, the monitoring module 220 communicates with various sensors of the sensor system 120 including one or more of: camera(s) 126 (e.g., for gaze/eye tracking), heart rate monitor sensors, infrared sensors, seat position sensors, and so on. In one embodiment, the sensors are located within a passenger compartment of the vehicle 100 and can be positioned in various locations in order to acquire information about the noted aspects of the operator and/or aspects related to the operator.

In either case, the monitoring module 220 collects information about the driver in order to gauge a response of the driver to the display scenario rendered at 340. Consequently, the engagement module 230 can adjust the graphical elements and/or other elements (e.g., haptic feedback) according to the determined response and/or engagement/awareness of the driver to further induce the driver to engage the driving tasks/surrounding environment.

That is, the engagement module 230 analyzes the driver state information collected by the monitoring module 220 to determine whether the driver is responding to the display scenario by engaging the driving tasks and the surrounding environment in an expected manner. For example, the engagement module 230, in one embodiment, can analyze the driver state information to determine whether the driver is visually scanning a region of the surrounding environment for the potential hazard, whether the driver is adjusting a speed and/or path of the vehicle 100 to account for the potential hazard, whether the driver is obeying laws (e.g., speed limits), and/or a combination of physiological factors relating to the driver that indicate awareness/engagement.

The engagement module 230, in one embodiment, analyzes the driver state information according to the hazard model 250 and/or a separate driver model that characterizes aspects of the driver behavior in order to determine engagement by the driver. Accordingly, the engagement module 230 can adjust the rendering of the display scenario, at 350, that depicts the potential hazard by further embellishing the graphical elements (e.g., decreasing opacity, increasing brightness, adding additional graphics, etc.) and/or by controlling the vehicle 100 to provide haptic feedback, generating an audible alert, etc.

Figure 4:
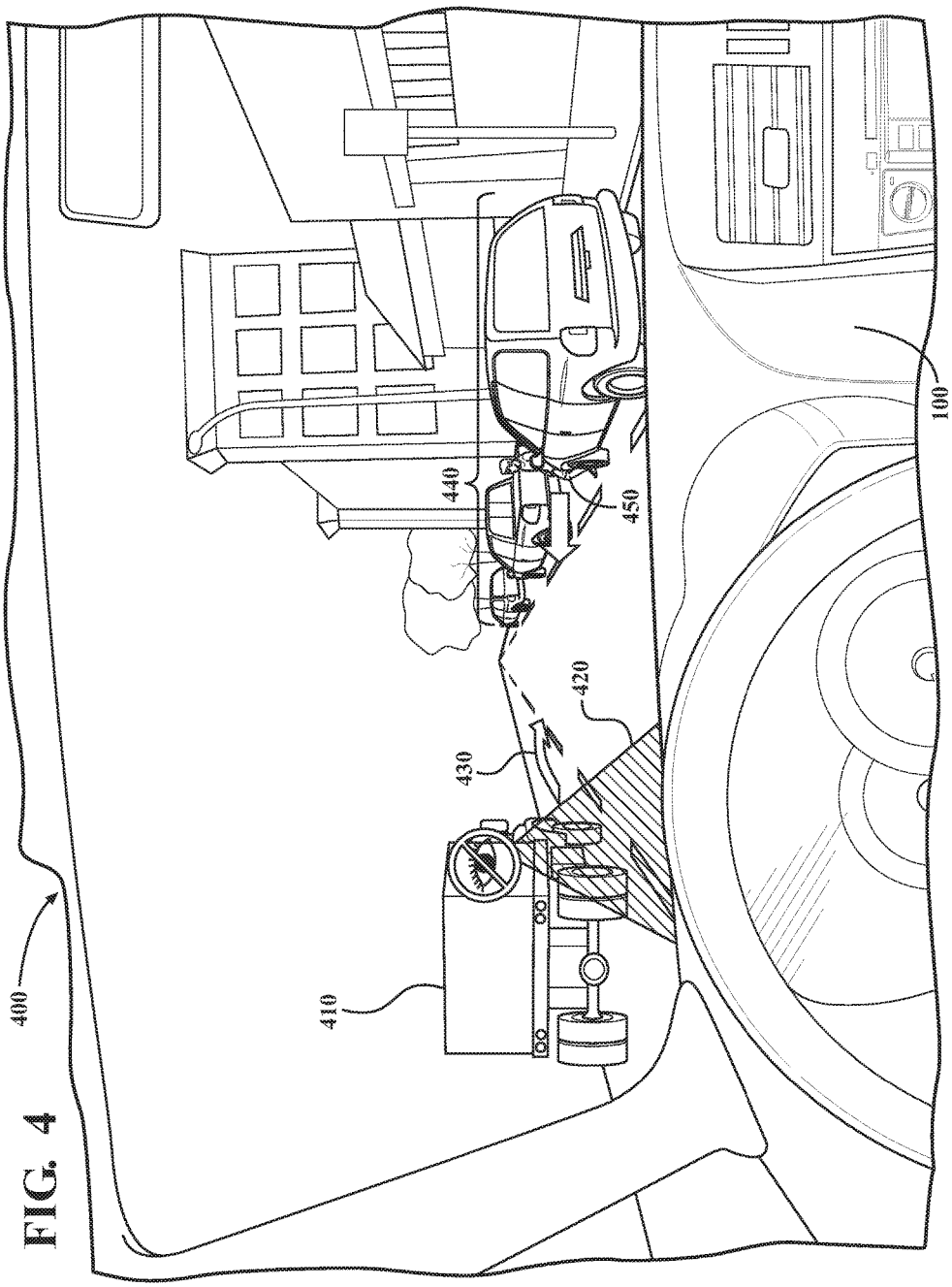
FIG. 4 is an interior view of a vehicle and graphical elements displayed within an AR system about potential hazards.

Further explanation of the functioning of the engagement system 170 will be discussed in relation to FIGS. 4-6. With reference to FIG. 4, an interior view 400 of the vehicle 100 illustrates one example of graphical elements displayed by the AR system 180 at the direction of the engagement module 230. For example, the interior view 400 is a forward view through a windshield of the vehicle 100. Thus, the view 400 illustrates graphical elements as rendered through an AR display that is, for example, integrated with the windshield. Accordingly, as illustrated, the engagement system 170 has identified two separate potential hazards in the view 400 of FIG. 4. A first hazard is the truck 410 traveling ahead of the vehicle 100. The engagement system 170 identifies the truck 410 as a potential hazard because the vehicle 100 is passing through a blind spot 420 of the truck 410. Thus, the system 170 illustrates the blind spot 420 of the truck 410 as a shaded region with an icon of an eye indicating that the truck 410 cannot see the vehicle 100. Moreover, the system 170 further renders an arrow 430 indicating that the truck 410 is a potential hazard because the truck 410 may merge into the lane of the vehicle 100 while the vehicle 100 is in the blind spot 420.

As a further example, the view 400 includes a line of parked vehicles 440 on the roadway. The parked vehicles 440 represent a potential hazard to the vehicle 100 because the parked vehicles 440 can obstruct a view of the driver of the vehicle 100, especially in circumstances where one or more of the parked vehicles 440 is a van or truck and/or when a shorter person such as a child moves from between the vehicles 440. Thus, the system 170 animates a person 450 (e.g., a child) repetitively moving from between the vehicles 440 with an arrow pointing in a direction of movement. In this way, the system 170 directs attention of the driver to zones of potential hazards around the vehicle 100. In further aspects, the engagement system 170 can also render graphical elements to inform the driver of how to control the vehicle 100. That is, the engagement module 230 can render graphics indicating to the driver that the vehicle 100 should slow down, merge away from the cars 440, and so on.

Figure 5:
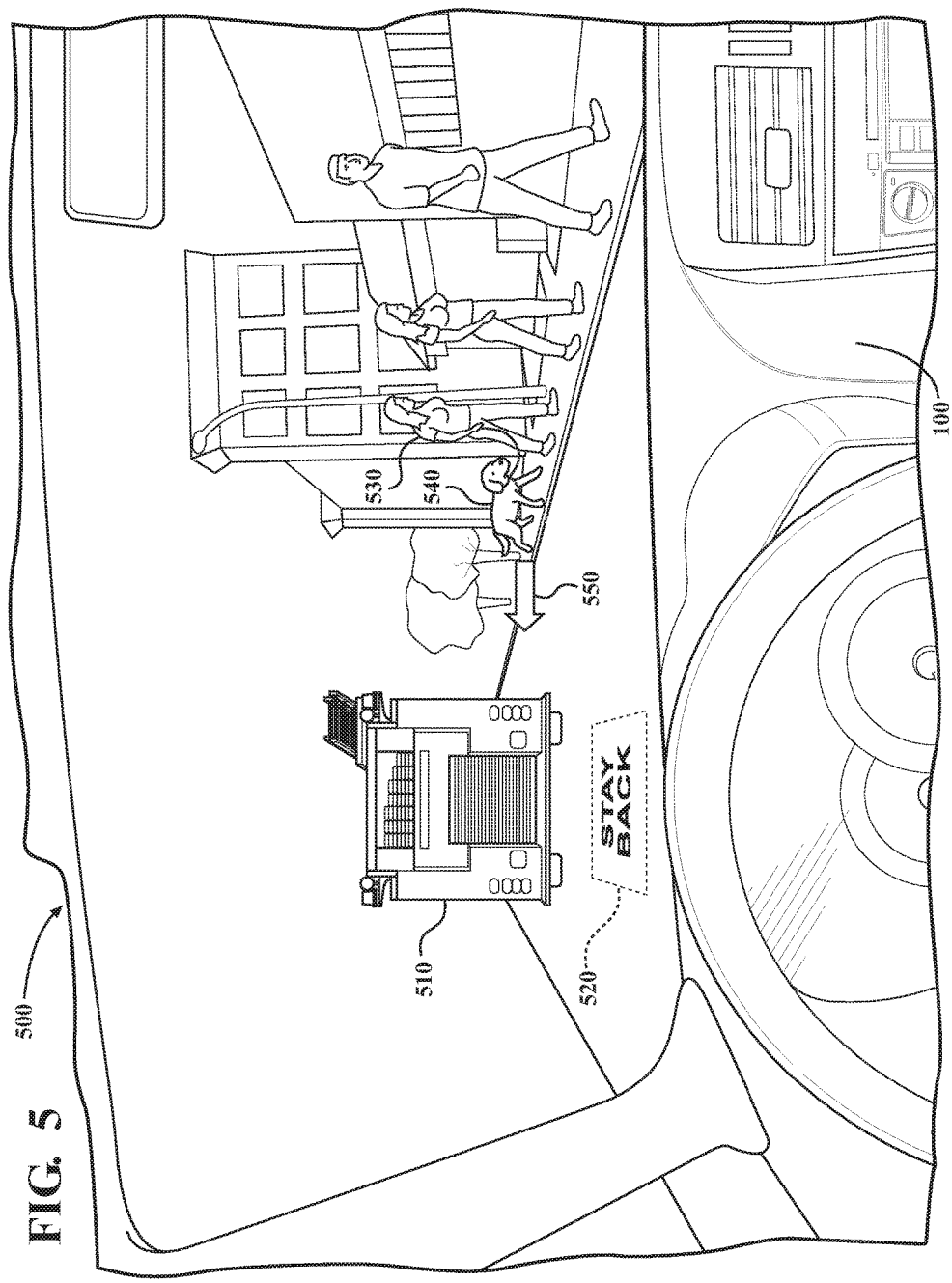
FIG. 5 is another interior view of a vehicle and graphical elements displayed within an AR system about potential hazards.

FIG. 5 illustrates an interior view 500 of the vehicle 100 similar to the view of FIG. 4. However, in FIG. 5, the system 170 is controlling the AR system 180 to render animations for different potential hazards. For example, the view 500 depicts a fire truck 510 traveling ahead of the vehicle 100. Thus, the system 170 determines that the fire truck 510 is a potential hazard because of, for example, potential erratic maneuvers, failing brakes of the vehicle 100, poor present awareness of the driver, novice skill level of the driver, and/or other aspects of the driver state, environment, and/or context of the surrounding environment. In either case, the system 170 controls the AR system 180 to animate a flashing text warning 520 within the roadway for the vehicle 100 to stay back from the truck 510.

Additionally, the engagement system 170 identifies a person 530 walking a dog 540 in a cavalier manner by, for example, not leashing the dog 540 and/or by using a reel-style leash that permits the dog 540 to abruptly run from the person 530. In either case, the engagement system 170 animates a moving arrow 550 indicating that the dog 540 and/or the person 530 may abruptly enter the roadway in front of the vehicle 100.

Figure 6:
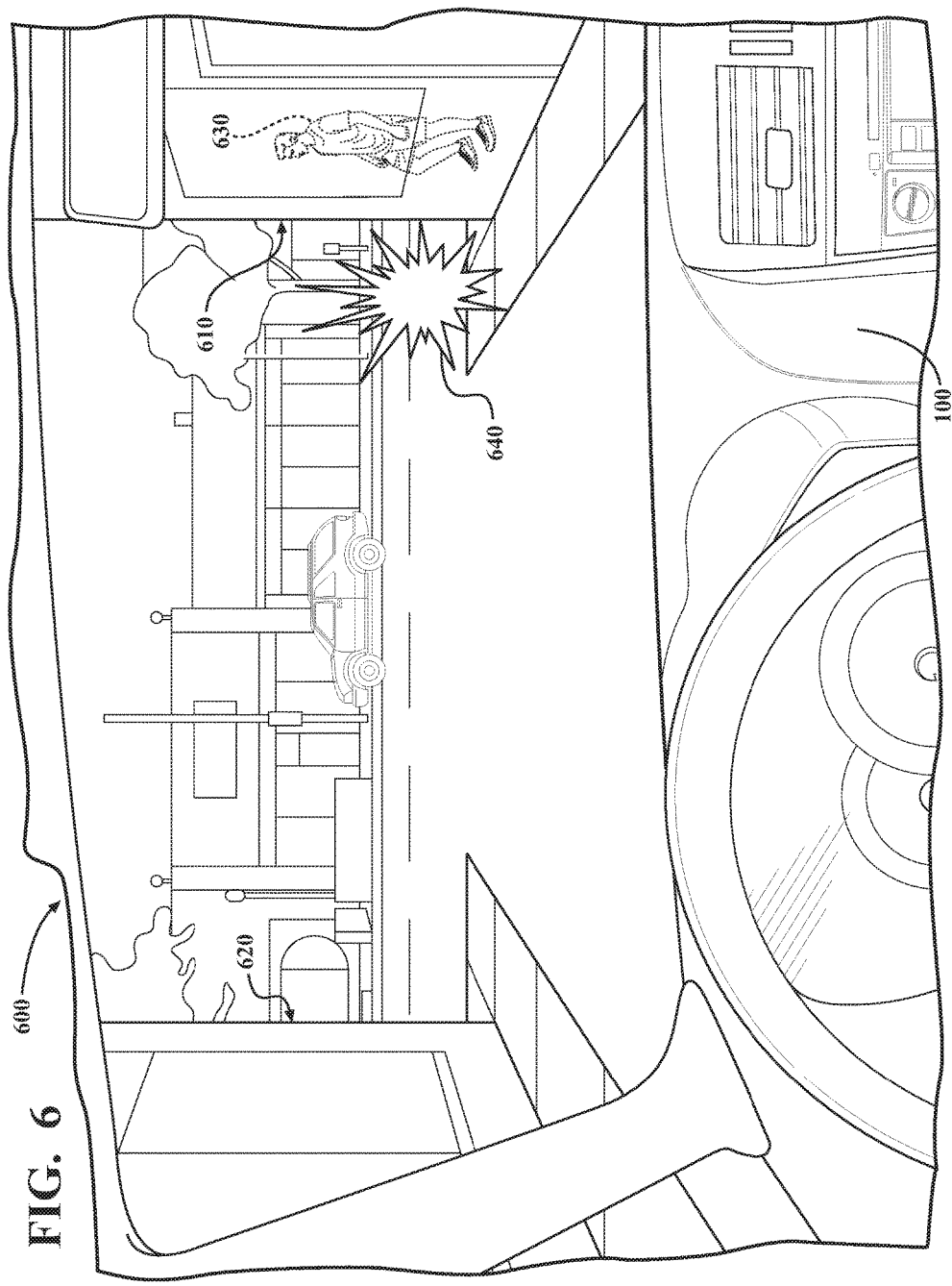
FIG. 6 is an interior view of a vehicle including graphical elements displayed within an AR system about potential hazards.

As a further example, FIG. 6 illustrates a view 600 of a narrow alley with two blind corners 610 and 620 caused by the buildings. Accordingly, the engagement system 170 identifies the blind corners 610 and 620 and renders an outline of a person 630 walking from behind the blind corner 610. Moreover, the engagement system 170 can also illustrate a cartoonish collision symbol 640 to further emphasize the possibility of a collision with a person or object crossing the roadway from the blind corner 610. In this way, the engagement system 170 uses information about detected potential hazards in the surrounding environment to render graphics with the AR system 180 and motivate the driver to engage driving tasks.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle driver (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the engagement system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the engagement system 170, and/or the autonomous driving module(s) 160 may control some or all of these vehicle systems 140 and, thus, may be partially or fully autonomous.

The processor(s) 110, the engagement system 170, and/or the autonomous driving module(s) 160 can be operatively connected to communicate with the various vehicle systems 140 and/or individual components thereof. For example, returning to FIG. 1, the processor(s) 110, the engagement system 170, and/or the autonomous driving module(s) 160 can be in communication to send and/or receive information from the various vehicle systems 140 to control the movement, speed, maneuvering, heading, direction, etc. of the vehicle 100. The processor(s) 110, the engagement system 170, and/or the autonomous driving module(s) 160 may control some or all of these vehicle systems 140.

The processor(s) 110, the engagement system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the engagement system 170, and/or the autonomous driving module(s) 160 can control the direction and/or speed of the vehicle 100. The processor(s) 110, the engagement system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the engagement system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

The invention claimed is:

1. An engagement system for inducing awareness in a driver about a surrounding environment of a vehicle using an augmented reality (AR) system within the vehicle, comprising:

one or more processors;

a memory communicably coupled to the one or more processors and storing;

a monitoring module including instructions that when executed by the one or more processors cause the one or more processors to identify one or more potential hazards to the vehicle in the surrounding environment from sensor data collected from at least one sensor of the vehicle, wherein the potential hazards include contextual hazards that are likelihoods of risk relating to combinations of properties of the surrounding environment and positions of objects within the surrounding environment forming circumstances that define the contextual hazards; and an engagement module including instructions that when executed by the one or more processors cause the one or more processors to render, within the AR system, a display scenario about the one or more potential hazards by displaying one or more graphical elements that correlate with locations of the one or more potential hazards in the surrounding environment, wherein the engagement module includes instructions to render the display scenario associated with one of the contextual hazards by animating an undetected object according to a likelihood that the undetected object is present in an occluded area associated with one or more of the locations, and wherein animating the undetected object includes displaying the one or more graphical elements according to a type of the undetected object.

2. The engagement system of claim 1, wherein the potential hazards are likelihoods of risk defined according to detected objects and the circumstances in the surrounding environment, wherein the monitoring module includes instructions to identify the one or more potential hazards by analyzing the sensor data according to a hazard model that identifies the likelihoods of risk associated with hazardous encounters involving the vehicle according to aspects of the detected objects, associations between the detected objects, and contextual information about the surrounding environment, and wherein the engagement module further includes instructions to render the one or more graphical elements by generating the graphical elements to communicate a control behavior for the vehicle to avoid the one or more potential hazards and why the one or more potential hazards represent a risk to the vehicle.

3. The engagement system of claim 2, wherein the monitoring module includes instructions to identify the one or more potential hazards by analyzing the sensor data using at least the hazard model that accepts the sensor data as an electronic input and identifies the one or more potential hazards according to the hazard model.

4. The engagement system of claim 2, wherein the potential hazards are comprised of the contextual hazards, and discrete hazards, and wherein the discrete hazards are openly visible hazards that relate to detected objects that are on an intercepting trajectory with the vehicle.

5. The engagement system of claim 1, wherein the monitoring module further includes instructions to collect the sensor data from the at least one sensor by electronically controlling the at least one sensor to at least semi-continuously scan the surrounding environment to detect objects and obstacles in the surrounding environment, and wherein the sensor data includes environmental information about the surrounding environment, contextual information about properties of a current operation of the vehicle, and driver state information indicating a current condition of the driver.

6. The engagement system of claim 1, wherein the engagement module further includes the instructions to render the display scenario by animating the one or more graphical elements to visually depict the one or more potential hazards in graphical form as a portrayal of the one or more potential hazards presently occurring, and wherein the engagement module includes instructions to animate the graphical elements as an overlay on the surrounding environment using an AR display of the AR system within the vehicle.

7. The engagement system of claim 6, wherein the engagement module further includes the instructions to render the display scenario by rendering: animations of objects intersecting with a trajectory of the vehicle from unexpected locations, animations of the objects moving from behind blind corners, animations of the objects within zones proximate to the vehicle, animations of one of the objects moving along a diverging path of movement that is contrary to a current path of movement, and animations that highlight the zones within the surrounding environment associated with the potential hazards.

8. The engagement system of claim 1, wherein the AR system includes at least one display that is integrated with a windshield of the vehicle.

9. A non-transitory computer-readable medium for inducing awareness in a driver about a surrounding environment of a vehicle using an augmented reality (AR) system within the vehicle and storing instructions that when executed by one or more processors cause the one or more processors to:

identify one or more potential hazards to the vehicle in the surrounding environment from sensor data collected from at least one sensor of the vehicle, wherein the potential hazards include contextual hazards that are likelihoods of risk relating to combinations of properties of the surrounding environment and positions of objects within the surrounding environment that form circumstances defining the contextual hazards; and render, within the AR system, a display scenario about the one or more potential hazards by displaying one or more graphical elements that correlate with locations of the one or more potential hazards in the surrounding environment, wherein the instructions to render include instructions to render the display scenario associated with one of the contextual hazards by animating an undetected object according to a likelihood that the undetected object is present in an occluded area associated with one or more of the locations, and wherein animating the undetected object includes displaying the one or more graphical elements according to a type of the undetected object.

10. The non-transitory computer-readable medium of claim 9, wherein the potential hazards are defined according to likelihoods of risk associated with detected objects and the circumstances in the surrounding environment, wherein the instructions to identify the one or more potential hazards include instructions to analyze the sensor data according to a hazard model that identifies the likelihoods of risk associated with hazardous encounters involving the vehicle according to aspects of the detected objects, associations between the detected objects, and contextual information about the surrounding environment.

11. The non-transitory computer-readable medium of claim 10, wherein the instructions to identify the one or more potential hazards include instructions to analyze the sensor data using the hazard model and a machine learning algorithm that accepts the sensor data as an electronic input and identifies the one or more potential hazards according to the hazard model, and wherein the instructions to render the one or more graphical elements include instructions to generate the graphical elements to communicate a control behavior for the vehicle to avoid the one or more potential hazards and why the one or more potential hazards represent a risk to the vehicle.

12. The non-transitory computer-readable medium of claim 9, further comprising instructions to collect the sensor data from the at least one sensor by electronically controlling the at least one sensor to at least semi-continuously scan the surrounding environment to detect objects and obstacles in the surrounding environment, wherein the sensor data includes environmental information about the surrounding environment, contextual information about properties of a current operation of the vehicle, and driver state information indicating a current condition of the driver.

13. The non-transitory computer-readable medium of claim 9, wherein the instructions to render the display scenario include instructions to animate the one or more graphical elements to visually depict the one or more potential hazards in graphical form as a portrayal of the one or more potential hazards as presently occurring, and wherein the instructions to the animate the graphical elements include instructions to animate the graphical elements as an overlay on the surrounding environment using an AR display of the AR system within the vehicle.

14. A method for inducing awareness in a driver about a surrounding environment of a vehicle using an augmented reality (AR) system within the vehicle, comprising:

identifying one or more potential hazards to the vehicle in the surrounding environment from sensor data collected from at least one sensor of the vehicle, wherein the potential hazards include contextual hazards that are likelihoods of risk relating to combinations of properties of the surrounding environment and positions of objects within the surrounding environment forming circumstances that define the contextual hazards; and rendering, within the AR system, a display scenario about the one or more potential hazards by displaying one or more graphical elements that correlate with locations of the one or more potential hazards in the surrounding environment, wherein rendering the display scenario includes rendering the display scenario associated with one of the contextual hazards by animating an undetected object according to a likelihood that the undetected object is present in an occluded area associated with one or more of the locations, and wherein animating the undetected object includes displaying the one or more graphical elements according to a type of the undetected object.

15. The method of claim 14, wherein the potential hazards are defined according to likelihoods of risk associated with detected objects and the circumstances in the surrounding environment, wherein identifying the one or more potential hazards includes analyzing the sensor data according to a hazard model that identifies the likelihoods of risk associated with hazardous encounters involving the vehicle according to aspects of the detected objects, associations between the detected objects, and contextual information about the surrounding environment.

16. The method of claim 15, wherein identifying the one or more potential hazards includes analyzing the sensor data using the hazard model and a machine learning algorithm that accepts the sensor data as an electronic input and identifies the one or more potential hazards according to the hazard model, and wherein rendering the one or more graphical elements includes generating the graphical elements to communicate a control behavior for the vehicle to avoid the one or more potential hazards and why the one or more potential hazards represent a risk to the vehicle.

17. The method of claim 15, wherein the potential hazards are comprised of the contextual hazards, and discrete hazards, and wherein the discrete hazards are openly visible hazards that relate to detected objects that are on intercepting trajectories with the vehicle.

18. The method of claim 14, further comprising:

collecting the sensor data from the at least one sensor by electronically controlling the at least one sensor to at least semi-continuously scan the surrounding environment to detect objects and obstacles in the surrounding environment, wherein the sensor data includes environmental information about the surrounding environment, contextual information about properties of a current operation of the vehicle, and driver state information indicating a current condition of the driver.

19. The method of claim 14, wherein rendering the display scenario includes animating the one or more graphical elements to visually depict the one or more potential hazards in graphical form as a forecasted portrayal of the one or more potential hazards presently occurring, and wherein the animating overlays the graphical elements on the surrounding environment using an AR display within the vehicle.

20. The method of claim 19, wherein rendering the display scenario includes rendering animations of objects intersecting with a projected trajectory of the vehicle from unexpected locations, animations of objects projected to move from behind blind corners, animations of objects within zones proximate to the vehicle, and animations that highlight the zones within the surrounding environment associated with the potential hazards.

* * * * *

UNITED STATES PATENT AND TRADEMARK OFFICE
CERTIFICATE OF CORRECTION

PATENT NO. : 10,134,279 B1
APPLICATION NO. : 15/625595
DATED : November 20, 2018
INVENTOR(S) : Heishiro Toyoda et al.

Page 1 of 1

It is certified that error appears in the above-identified patent and that said Letters Patent is hereby corrected as shown below:

In the Claims

Column 9, Line 4:
Delete "from a health" and insert --from health--

Column 11, Line 6:
Insert --,-- between ")" and "and"

Column 23, Line 6:
Delete "to the animate" and insert --to animate--

Signed and Sealed this
Twenty-third Day of July, 2019

Andrei Iancu
*Director of the United States Patent and Trademark Office*